Aug. 6, 1957 G. WILDHAGEN 2,802,055

TWO-WAY LOUDSPEAKER INTERCOMMUNICATION SYSTEM

Filed July 10, 1953 2 Sheets-Sheet 1

Inventor:
Gerhard Wildhagen
By [signature]
Att'y

TWO-WAY LOUDSPEAKER INTERCOMMUNICATION SYSTEM

Filed July 10, 1953 2 Sheets-Sheet 2

Inventor:
Gerhard Wildhagen
By
Att'y

United States Patent Office 2,802,055

Patented Aug. 6, 1957

2,802,055

TWO-WAY LOUDSPEAKER INTER-COMMUNICATION SYSTEM

Gerhard Wildhagen, Grafelfing, Germany, assignor to Siemens & Halske Aktiengesellschaft, Munich, Germany, a corporation of Germany Application July 10, 1953, Serial No. 367,292

Claims priority, application Germany August 29, 1952

14 Claims. (Cl. 179—1)

The invention relates to a two-way loudspeaker intercommunication system in which parties can establish two-way talking connections by way of known selectors and trunk lines responsive to actuation of a key.

It is an object of the invention to provide a two-way intercommunication system wherein a two-conductor trunk line extending between interconnected stations may be several miles long. A further object is to permit the station microphones to be effectively operated, and the station loudspeakers to be audible, from a considerable distance, say up to four yards.

Known two-way intercommunicating systems of this character generally employ central amplifiers common to all parties. However, central amplifiers are not usable where the distances between the parties are substantial. Therefore, it is customary to provide each party with its own amplifier; and each station has accordingly been provided with its own source of current supply. This is disadvantageous because in certain circumstances it is difficult or even impossible, for example for safety reasons, to provide separate current sources for the individual stations.

For this reason, the present invention proposes to equip each station with one or more amplifiers which are supplied with current from a source common to all stations.

According to a further feature of the invention, reversal of the talking direction is brought about by a change in the intensity and/or phase of the feed current, which change is controlled over the trunk line by one of the parties, preferably by the calling party. Preferably this reversal of the direction of talking is effected by reversing the polar connections from the feed battery common to the station amplifiers.

The invention will now be explained with reference to the accompanying drawings, wherein Fig. 1 shows a basic circuit;

Figure 1:
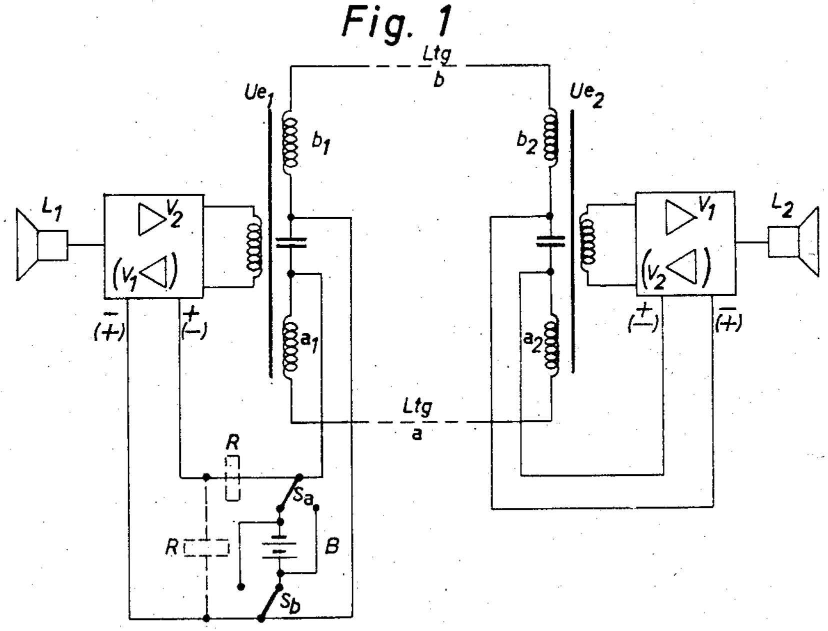
Figure 2:
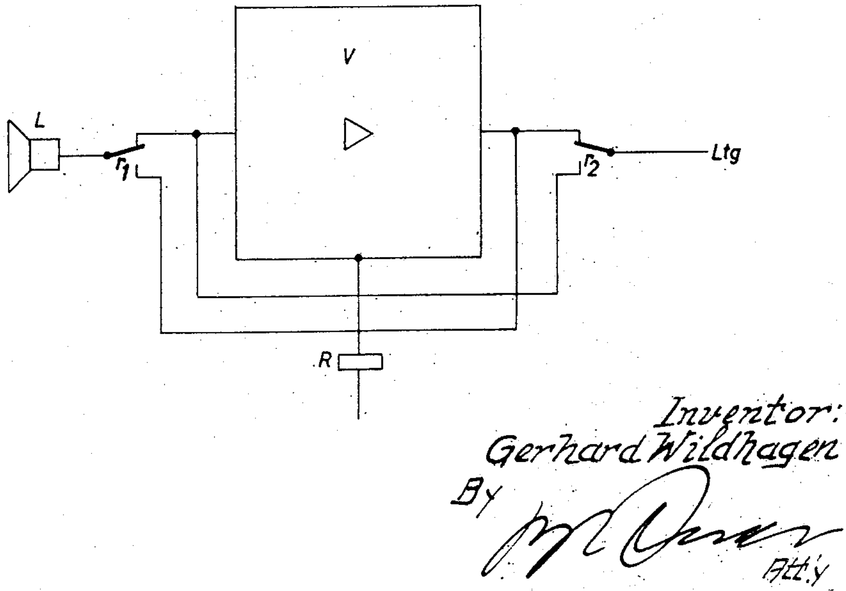
Fig. 2 illustrates a scheme in which the switching-over is controlled by a relay disposed in the signalling loop.

Fig. 1 diagrammatically illustrates the principle underlying an arrangement according to the invention, employing a battery for supplying current to the amplifiers at the stations. This battery is located at one of the stations but serves to supply all stations. Reversal from transmission to reception is controlled by reversal of the pole connections of battery B by the switch S. Such reversal may be effected without relays or, as indicated in Fig. 2, with the use of a relay connected in the signalling loop. As will be evident from Fig. 2, where the change-over from transmission to reception is effected with the aid of a relay, a signal amplifier V may be used for both directions of operation; the relay then acts to change the connections at the inlet and outlet of the amplifier for the desired direction of operation.

Figure 3:
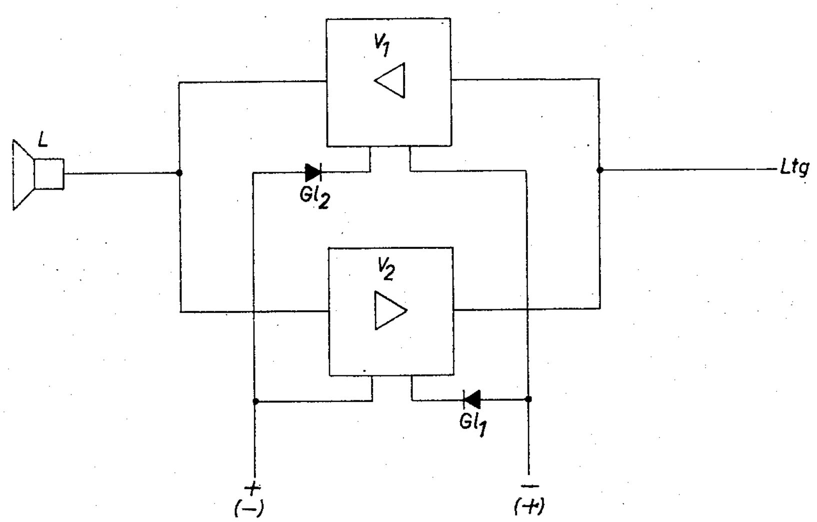
Fig. 3 shows an embodiment comprising rectifiers for interrupting the current supply for the loudspeakers.
Figure 4:
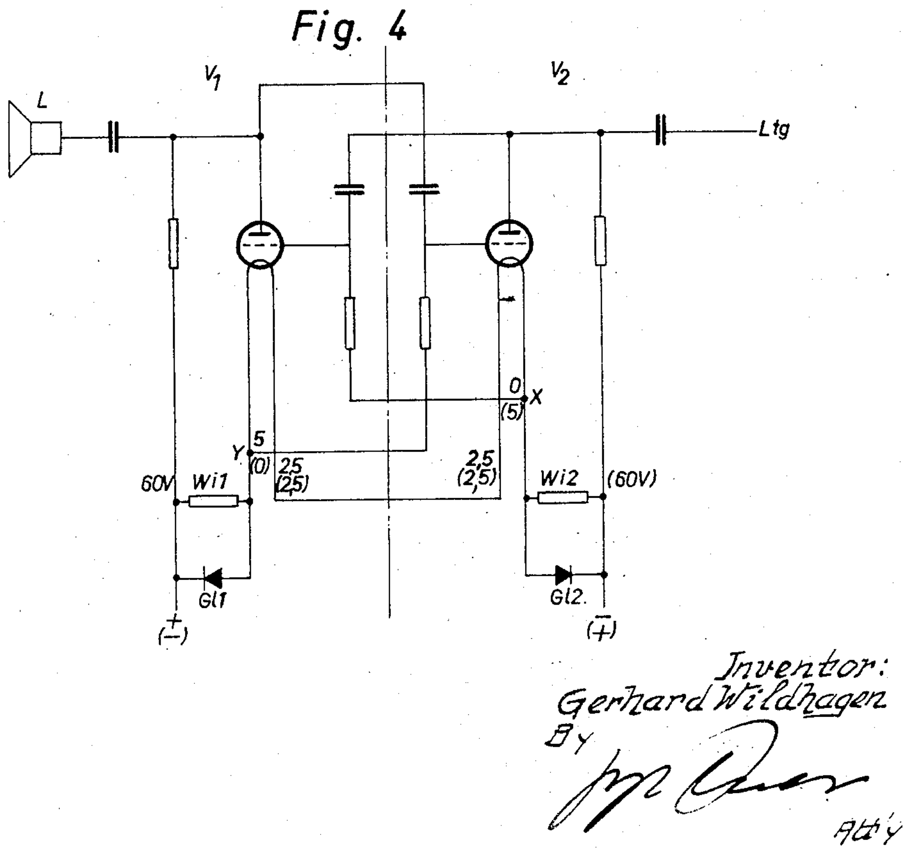
Fig. 4 illustrates an embodiment in which the heating current for the amplifiers of a connection is maintained at full value.

In the embodiments of Figs. 3 and 4, as well as in Fig. 1, it is assumed that each station is equipped with separate amplifiers for transmission and reception, respectively. In the embodiment of Fig. 3, the amplifier not required for a given direction of transmission is completely disconnected by switching means responsive to the direction of the current. In the embodiment according to Fig. 4, the idle amplifier is disconnected by having its anode voltage removed while the heating circuit remains operative so that the amplifier remains ready for immediate use upon changeover.

As shown in Fig. 1, the stations are equipped with loudspeakers $L_1$ and $L_2$, respectively, which serve at the same time as microphones. The speaker-microphone operates in each case an amplifier V whose output is connected by a repeated coil *Ue* to the two-conductor trunk line L*tg*. A station of identically the same construction is connected at the other end of this line. Current is supplied to both stations from a common battery B which is advantageously located at one of the stations. In the illustrated embodiment this is the left-hand station. A switch having contacts $S_a$ and $S_b$, actuated by the calling party, is adapted to reverse the polar connections to the battery B. With the position of the switch as shown, it is assumed that the left-hand station is connected for transmission, and the right-hand station for reception. The operating voltage for the transmitting amplifier in the left-hand station will then be of opposite polarity to that of the receiving amplifier in the right-hand station. This is indicated by the polarity symbols — and + at the left-hand station and + and — at the right-hand station. The circuit for feeding the left-hand amplifier is as follows: +, switch contact $S_a$, amplifier $V_2$, switch contact $S_b$, —. The feed circuit for the right-hand amplifier is as follows: +, switch contact $S_a$, winding portion $a_1$ of repeater $Ue_1$, conductor *a* of trunk L*tg*, winding portion $a_2$ of repeater $Ue_2$, amplifier $V_1$, winding portion $b_2$ of repeater $Ue_2$, conductor *b* of trunk L*tg*, winding portion $b_1$ of repeater $Ue_1$, switch contact $S_b$, —.

As already mentioned, the switch having the contacts $S_a$ and $S_b$ is controlled at the left-hand station which is thereby enabled to switch from transmission to reception. It is, of course, possible to equip the right-hand station with known control means so that the switch $S_a$—$S_b$ can be remotely controlled from that station. This may be accomplished, for example, by having the right-hand station initiate signals, preferably of a frequency beyond the audible range, which actuate a relay in the left-hand station that effects reversal of the polar connections to the battery for the left-hand station.

The arrangement shown in Fig. 1 presupposes that separate amplifiers are at least on the anode sides provided at each station for transmission and reception respectively. If a single amplifier is to be used for both transmitting and receiving, as shown in Fig. 2, then each station must be equipped with a reversing relay R which connects the inlet and outlet of the amplifier respectively either to the trunk and to the loudspeaker, or vice versa, depending on the desired direction of transmission. In Fig. 1, the incorporation of this relay R in the D. C. loop is shown in dotted lines; as indicated, the relay may be either in series in one of the conductors or bridged across the two conductors of this control circuit.

Fig. 2, which shows only a single-pole connection for the sake of clarity, illustrates the switching function of the relay R. In the position shown, contacts $r_1$, $r_2$ of the relay R connect the loudspeaker L (acting as a microphone) to the amplifier input side, for transmission; the amplifier output being connected to the trunk L*tg*. Upon actuation of the relay R to change over to reception, contacts $r_2$, $r_1$ connect the trunk L*tg* to the input side of the amplifier and the loudspeaker L to the output of the amplifier.

To operate the relay R, it is not necessary to completely reverse the polar connections of battery B; the relay is operated merely by a change in the amplifier feed current, for example by increasing or reducing the voltage, or by a voltage impulse, whereupon the relay will effect, at contacts $r_1$, $r_2$, the connections of the amplifier input and output required for the desired direction of transmission.

Fig. 3 shows an embodiment in which reversal of the polarity from battery causes the rectifiers $Gl_1$, $Gl_2$ to interrupt the current supply to one or the other of the amplifiers $V_1$, $V_2$. This may involve either an interruption of both heating and anode currents or only an interruption of the heating current.

Fig. 4 shows an embodiment of the invention in which the two amplifiers (for transmission and reception) of a station are always maintained under full heating current so that the idle amplifier is always ready for immediate use upon polarity reversal from battery for reversal of the direction of transmission. For the sake of simplicity, both amplifiers are illustrated in this figure as single-stage, but of course each amplifier may comprise several stages.

With battery connected as shown in Fig. 4, the anode side of the receiving amplifier $V_1$ is on positive battery, while the anode side of the transmitting amplifier $V_2$ is connected to the negative pole of the common battery so that it is blocked for the time being. The cathodes of both amplifier tubes are connected in series in a common heating circuit. The grid bias for the tubes $V_1$, $V_2$ is derived from potential drops in this heating circuit, the bias for $V_1$ being derived from point X while that of $V_2$ is derived from point Y. In order to permit the operated one of the amplifiers to utilize the full battery voltage, while nevertheless obtaining the same optimum grid bias for each of the amplifiers $V_1$, $V_2$ upon polarity reversal at the battery, it is necessary to produce a shift of potentials in the heating circuit of the tubes, this potential shift being responsive to the direction of transmission. To this end, direction-responsive resistances are inserted at the beginning and end of the heating circuit, each comprising an ohmic resistance and a rectifier connected in parallel therewith as indicated respectively at *Wi1 Gl1* and *Wi2 Gl2*. As a numerical example for the potential distribution in the heating circuit, the various values have been entered in Fig. 4 for both polarity connections of a 60 volt battery. In this manner, the grid bias of the operative amplifier is set at 2.5 volts relative to the negative end of the heating filament of the operative tube. Otherwise a battery of twice the indicated voltage would be necessary. The direction-responsive resistance serves to establish the potential difference between anode and cathode in the operative amplifier, while the idle amplifier should be substantially short-circuited. With the direction of current flow indicated in Fig. 4 by the symbols + and —, point X is connected to negative battery because resistance *Wi2* is shunted through rectifier *Gl2*, while the effective anode voltage appears between positive battery and point Y.

Upon polarity reversal, conditions are, of course, reversed.

Changes may be made within the scope and spirit of the appended claims.

I claim:

1. Two-way loudspeaker intercommunication system comprising a plurality of stations, a loudspeaker and an amplifier for each station, a two-conductor trunk line, a current source common to said stations, circuit means for supplying over said trunk line current to the amplifiers of all stations engaged in intercommunication, and common switching means controlled over said trunk line by any station engaged in intercommunication for altering the current supply for the amplifiers of all engaged stations to change the direction of communication therebetween.

2. The system and cooperation of elements as specified in claim 1, comprising a direct current source common to said stations, said common switching means effecting a reversal of polarity of said direct current source at the amplifiers of the stations engaged in intercommunication.

3. The system and cooperation of elements as specified in claim 2, comprising directional switching means in each amplifier, said reversal of polarity effecting switching through of the direction of communication in said amplifiers.

4. The system and cooperation of elements as specified in claim 1, comprising switching means at each station controlled by said alteration of said current supply for governing the operation of said amplifiers.

5. The system and cooperation of elements as specified in claim 1, comprising means at a calling and at a called station for controlling said common switching means to change the direction of communication between such stations.

6. The system and cooperation of elements as specified in claim 1, comprising means at a calling station for controlling said common switching means to change the direction of communication relative to a called station.

7. The system and cooperation of elements as specified in claim 1, comprising a station having separate amplifiers for transmitting and receiving, respectively, and switching means controlled by the potentials on the conductors of said trunk line for blocking one amplifier by negative plate potential while making the other amplifier effective by positive plate potential.

8. The system and cooperation of elements as specified in claim 7, comprising circuit means for continuing heating of the blocked amplifier to maintain it in preparatory operating condition.

9. The system and cooperation of elements as specified in claim 7, wherein said switching means controlled by the potentials on the conductors of said trunk line is disposed in the heater circuit of the corresponding amplifier.

10. The system and cooperation of elements as specified in claim 7, comprising a tube associated with each of said amplifiers, and circuit means for connecting the heating filaments of said tubes in series.

11. The system and cooperation of elements as specified in claim 9, comprising directional resistances in said heater circuits for controlling the potential drop for the grid bias of the associated tubes of the amplifiers, said resistances causing the operation of the corresponding tubes responsive to alteration of the polarity of said current source.

12. The system and cooperation of elements as specified in claim 11, wherein each directional resistance consists of a combination of an ohmic resistance and a rectifier connected in parallel relationship, and circuit means for disposing one such directional resistance at each end of the heater circuit.

13. The system and cooperation of elements as specified in claim 1, comprising a call key at a station, a filter circuit, and means controlled by said call key for shunting said filter circuit for controlling the operation of said common switching means.

14. The system and cooperation of elements as specified in claim 13, comprising common switching means and switching means individual to said stations for separating the current components transmitted over said trunk line.

References Cited in the file of this patent

UNITED STATES PATENTS

| | | |
|---|---|---|
| 2,275,405 | Berley | Mar. 10, 1942 |
| 2,323,307 | Campbell | July 6, 1943 |
| 2,385,515 | Herrick | Sept. 25, 1945 |
| 2,424,069 | Tschumi | July 15, 1947 |
| 2,468,911 | Aiken | May 3, 1949 |
| 2,477,275 | Tschumi | July 26, 1949 |
| 2,545,466 | Jeanlin | Mar. 20, 1951 |